United States Patent
Kim

[11] Patent Number: 6,046,564
[45] Date of Patent: Apr. 4, 2000

[54] PATH PLANNING APPARATUS AND METHOD FOR ROBOTS

[75] Inventor: Young-Sang Kim, Suwon, Rep. of Korea

[73] Assignee: Samsung Electronics Co., Ltd., Rep. of Korea

[21] Appl. No.: 09/219,816

[22] Filed: Dec. 23, 1998

[30] Foreign Application Priority Data

Dec. 31, 1997 [KR] Rep. of Korea ....................... 97-80191

[51] Int. Cl.[7] ........................... G05B 19/41; G05B 19/25; B25J 9/04
[52] U.S. Cl. .............................. 318/568.15; 318/568.19; 318/573
[58] Field of Search .................... 318/560–696; 364/474.28, 474.32

[56] References Cited

U.S. PATENT DOCUMENTS

| | | | |
|---|---|---|---|
| 3,757,095 | 9/1973 | Kiwiet | 318/571 |
| 4,603,286 | 7/1986 | Sakano | 318/615 |
| 4,833,399 | 5/1989 | So | 324/79 D |
| 5,057,756 | 10/1991 | Hara | 318/569 |
| 5,331,264 | 7/1994 | Cheng et al. | 318/568.11 |
| 5,434,489 | 7/1995 | Cheng et al. | 318/568.15 |
| 5,920,577 | 7/1999 | Ichimura et al. | 371/37.01 |

*Primary Examiner*—Paul Ip
*Attorney, Agent, or Firm*—Burns, Doane, Swecker & Mathis LLP

[57] ABSTRACT

Disclosed is a path planning apparatus and method for robots. The apparatus includes a planner which receives target positioning information, performs calculations using this information to obtain an initial speed profile, then outputs the initial speed profile; a low pass filter functioning as an interpolator which receives the initial speed profile from the planner, performs a predetermined operation on the same to obtain a filtered speed profile that is smoother than the initial speed profile, and outputs the filtered speed profile; a servo controller which receives output of the low pass filter and outputs acceleration and deceleration control signals according to the output of the low pass filter, and a servo motor which is controlled by the signals received from the servo controller. The method includes the steps of calculating an initial speed profile calculated after receiving input of signals corresponding to a predetermined target position, obtaining a filtered speed profile by interpolating the initial speed profile using a single low pass filter; and controlling acceleration and deceleration of a servo motor using the filtered speed profile.

13 Claims, 3 Drawing Sheets

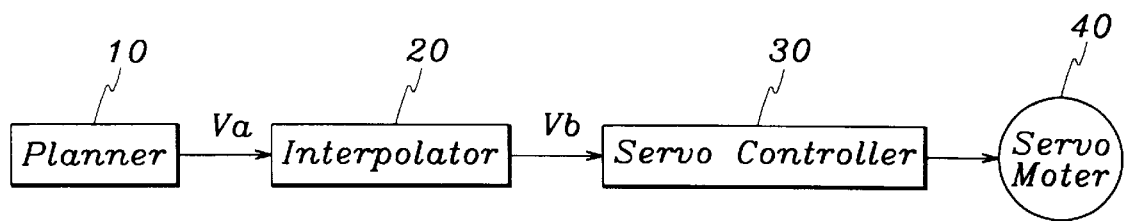
FIG._1
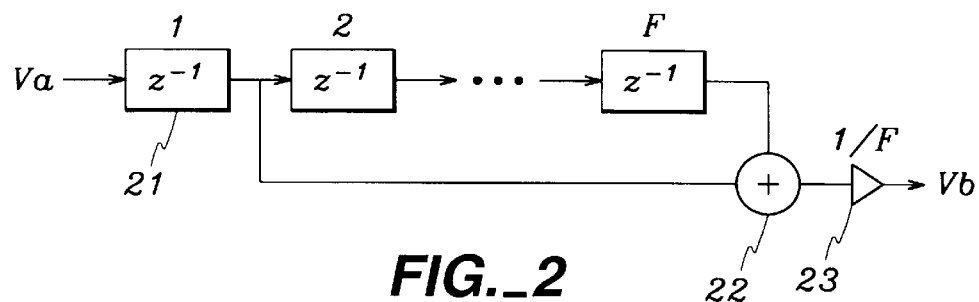
FIG._2
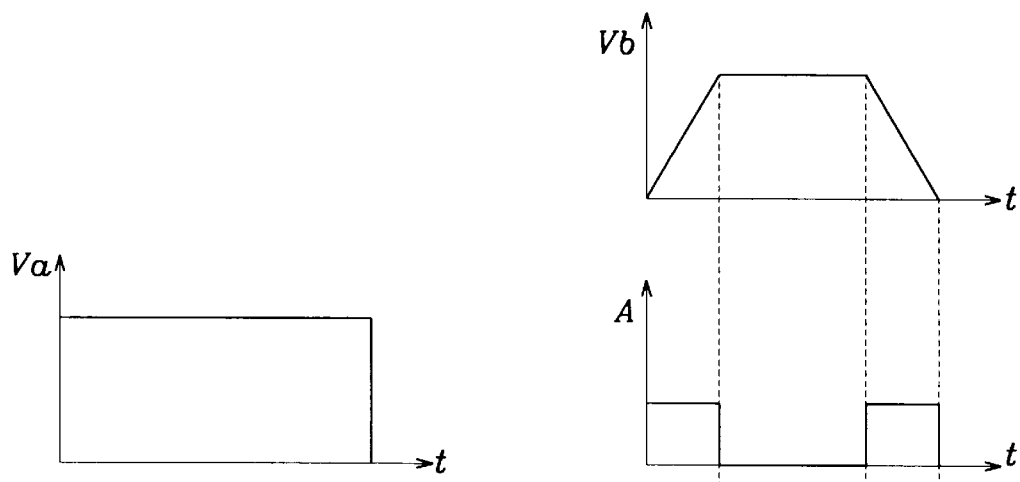
FIG._3
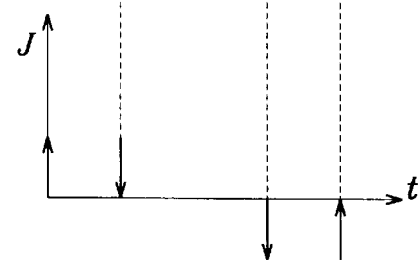
FIG._4

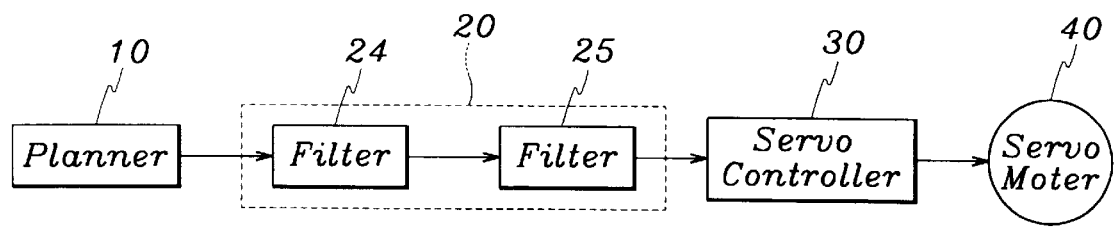
FIG._5
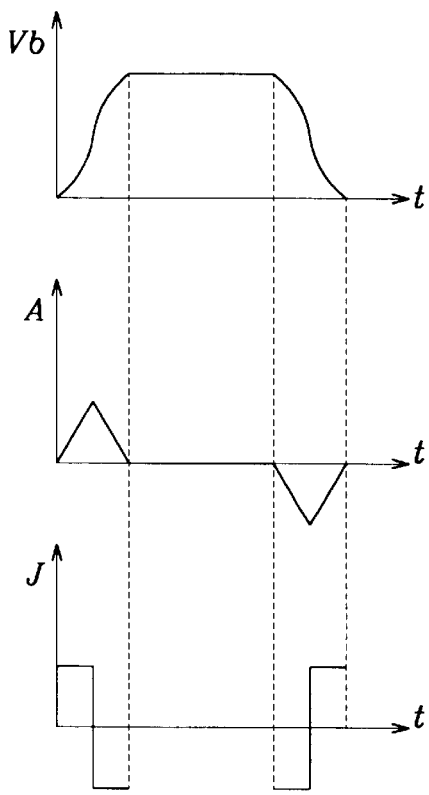
FIG._6
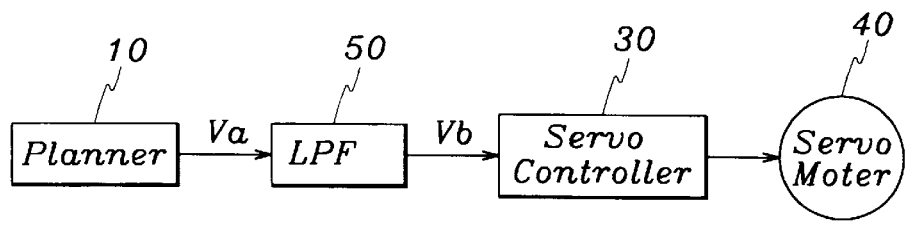
FIG._7

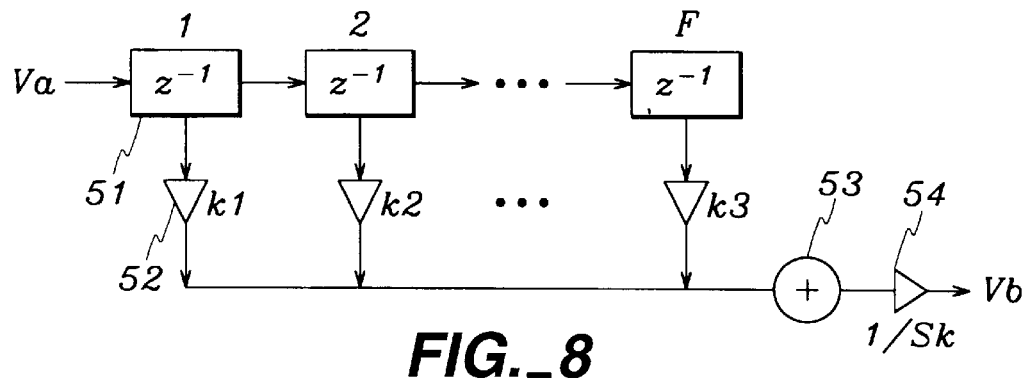
FIG._8
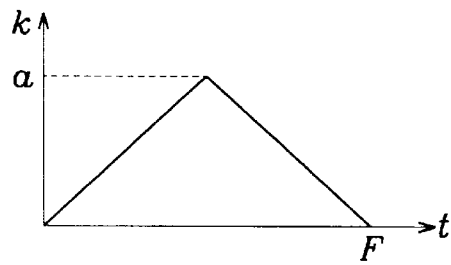
FIG._9a
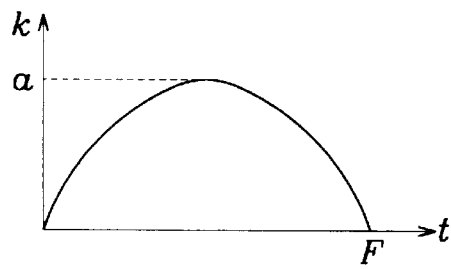
FIG._9b
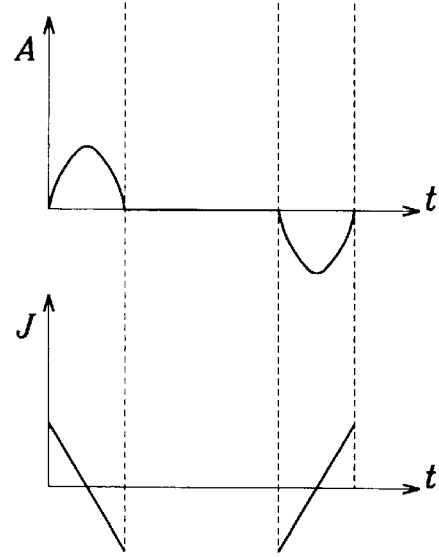
FIG._10

PATH PLANNING APPARATUS AND METHOD FOR ROBOTS

BACKGROUND OF THE INVENTION (a) Field of the Invention

The present invention relates to an apparatus for controlling robotic movements, and more particularly to a path planning apparatus and method for operating robots.

(b) Description of the Related Art

Path planning for robots used in industrial applications is of foremost concern for those in the field of robotics. In particular, the ability to precisely maintain a pre-programmed path, and smoothly and reliably realize corner blending between straight and curved path segments are attributes robots must possess. In recent times, these capabilities are realized utilizing acceleration/deceleration techniques that strive to make these changes in speed smooth.

A linear acceleration/deceleration control system using a linear filter is one type of such acceleration/deceleration technique. The linear control system allows for relatively quick acceleration and deceleration, but has the drawback of performing these movements too abruptly. Such abrupt acceleration and deceleration exert excessive stress on the robot body and related parts.

FIG. 1 shows a block diagram of a conventional path planning apparatus. The conventional path planning apparatus comprises a planner 10 which receives target positioning information, performs calculations using this information to obtain a speed profile, then outputs the speed profile; an interpolator 20 which receives the speed profile from the planner 10, executes a path interpolation operation using the received speed profile and outputs the resulting, more smooth speed profile; a servo controller 30 which receives the speed profile from the interpolator 20 and outputs corresponding control signals; and a servo motor 40 which is controlled by the signals received from the servo controller 30.

The interpolator 20 is a linear filter and, as shown in FIG. 2, includes at least one unit delay 21, an adder 22 and a coefficient multiplier 23. The letter "F" in the drawing indicates an order of the filter and serves as a length of an acceleration/deceleration section.

With reference also to FIGS. 3 and 4, in such a conventional path planning apparatus, the planner 10 outputs an initial speed profile Va, calculated to reach a target position, to the interpolator 20 which performs a path interpolation operation using the received initial speed profile Va to obtain a filtered speed profile Vb. The filtered speed profile Vb is then output by the interpolator 20 to the servo controller 30 which outputs control signals based on the filtered speed profile Vb to drive the servo motor 40.

As shown in FIG. 4, an acceleration profile A is obtained by differentiating the filtered speed profile Vb, after which the acceleration profile A is differentiated to obtain a jerk profile J. Here, jerk is a vector designating a time rate of change of acceleration and deceleration. Accordingly, the jerk profile J indicates the level of abrupt forces being exerted on the robot body and the degree to which robotic movements are executed in an abrupt fashion. Continued exposure to abrupt jerks results in damage to the robot body and related parts. As can be seen in FIG. 4, the jerk profile J resulting in the conventional path planning apparatus for robots is very abrupt.

U.S. Pat. No. 5,434,489 discloses a path planning apparatus for robots in which two linear filters are used to minimize abrupt forces being exerted on the robot body. FIG. 5 shows a block diagram of the path planning apparatus of the '489 patent. Since only an interpolator 20 of the '489 patent differs from that of the path planning apparatus described above, like reference numerals will be used for the other elements.

As shown in the drawing, the interpolator 20 comprises a first linear filter 24 and a second linear filter 25. With this configuration, when the initial speed profile Va is input to the interpolator 20 by the planner 10, a filtered speed profile Vb' as shown in FIG. 6 is output from the interpolator 20. Sections corresponding to acceleration and deceleration are curves of second order functions.

An acceleration speed profile A' and a jerk profile J' are obtained from the filtered speed profile Vb' as in the above. As shown in the drawing, the jerk profile J' obtained with the use of the two linear filters 24 and 25 is smoother than when utilizing only a single linear filter, thereby reducing damage given to the robot body and making the robotic movements less abrupt. Nevertheless, the problem of significant changes in jerk remains such that the same negative results occur. Further, the use of the second filter has the effect of increasing calculation times, and therefore overall response times of the robot are delayed.

SUMMARY OF THE INVENTION

The present invention has been made in an effort to solve the above problems.

It is an object of the present invention to provide a path planning apparatus and method for robots in which a change in jerk is not abrupt such that damage to a robot body is reduced and robotic movements are smooth.

It is another object of the present invention to provide a path planning apparatus and method for robots in which response time is improved.

To achieve the above objects, the present invention provides a path planning apparatus and method for robots. The apparatus includes a planner which receives target positioning information, performs calculations using this information to obtain an initial speed profile, then outputs the initial speed profile; a low pass filter functioning as an interpolator which receives the initial speed profile from the planner, performs a predetermined operation on the same to obtain a filtered speed profile that is smoother than the initial speed profile, and outputs the filtered speed profile; a servo controller which receives output of the low pass filter and outputs acceleration and deceleration control signals according to the output of the low pass filter, and a servo motor which is controlled by the signals received from the servo controller.

According to a feature of the present invention, the low pass filter includes a plurality of unit delays connected in series and operate to output delay signals; a plurality of first multipliers for multiplying predetermined gain values to each of the delay signals output from the unit delays; an adder for obtaining a sum of the output of the first multipliers and outputting the same; and a second multiplier which multiplies the output of the adder to an inverse of the sum of all the gain values to obtaining the filtered speed profile.

Preferably, the unit delays are shift register.

The method includes the steps of calculating an initial speed profile calculated after receiving input of signals corresponding to a predetermined target position; obtaining a filtered speed profile by interpolating the initial speed profile using a single low pass filter; and controlling acceleration and deceleration of a servo motor using the filtered speed profile.

According to a feature of the method of the present invention, the step of obtaining the filtered speed profile further includes the steps of outputting a plurality of delay signals having sequential delay values by successively delaying the input signals; multiplying predetermined gain values to each of the delay signals and outputting the resulting values: obtaining a sum of the values resulting from multiplying the gain values to the delay signals, and outputting a resulting sum value; and multiplying the sum value to an inverse of a sum of all the gain values.

According to another feature of the method of the present invention, calculation of the sum of all the gain values and establishment of the same as an initial value is performed before operation of the low pass filter.

According to yet another feature of the method of the present invention, the gain values are adjusted to control acceleration and deceleration of the servo motor.

According to a feature of the apparatus and method of the present invention, when the gain values are a first order function related to time, the first order function is expressed by the following equation:

$$k(t) = \begin{cases} \dfrac{2a}{F}t & 0 < tPREC \dfrac{F}{2}, \\ \dfrac{2a}{F}(F-t) & \dfrac{F}{2} < tPRECF. \end{cases}$$

where t is time, k(t) are the gain values, F is a size of an acceleration interval of the servo motor, and a is a random number $\geq 0$.

According to another feature of the apparatus and method of the present invention, when the gain values are a second order function related to time, the second order function is expressed by the following equation:

$$k(t) = -at(t-F),\ 0 < t < F$$

where t is time, k(t) are the gain values, F is a size of an acceleration interval of the servo motor, and a is a random number $\geq 0$.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 is a block diagram of a conventional path planning apparatus for robots;

FIG. 2 is a block diagram of an interpolator shown in FIG. 1;

FIG. 3 is graph of a speed profile input into the interpolator of FIG. 1;

FIG. 4 is a graph of a speed profile, and an acceleration profile and a jerk profile differentiated from the speed profile, output from the interpolator of FIG. 1;

FIG. 5 is a block diagram of a conventional path planning apparatus for robots having an interpolator using two linear filters;

FIG. 6 is a graph of a speed profile, and an acceleration profile and a jerk profile differentiated from the speed profile, output from the interpolator of FIG. 5;

FIG. 7 is a block diagram of a path planning apparatus for robots according to a preferred embodiment of the present invention;

FIG. 8 is a block diagram of a low pass filter shown in FIG. 7;

FIGS. 9a and 9b are graphs illustrating gain values of the low pass filter shown in FIG. 7: and FIG. 10 is a graph of a speed profile, and an acceleration profile and a jerk profile differentiated from the speed profile, output from the low pass filter of FIG. 7.

DETAILED DESCRIPTION OF THE PREFERRED EMBODIMENTS

A preferred embodiment of the present invention will now be described in detail with reference to the accompanying drawings.

FIG. 7 shows a block diagram of a path planning apparatus for robots according to a preferred embodiment of the present invention. As shown in the drawing, the inventive planning apparatus for robots comprises a planner 10 which receives target positioning information, performs calculations using this information to obtain an initial speed profile Va, then outputs the speed profile Va; a low pass filter 50 which receives the initial speed profile Va from the planner 10, performs a predetermined operation on the same to obtain a filtered speed profile Vb" that is smoother than the initial speed profile Va, and outputs the filtered speed profile Vb"; a servo controller 30 which receives output of the low pass filter 50 and outputs acceleration and deceleration control signals; and a servo motor 40 which is controlled by the signals received from the servo controller 30. The low pass filter 50 executes path interpolation and so therefore functions as in interpolator.

Referring to FIG. 8, shown is a block diagram of the low pass filter 50. The low pass filter 50 comprises a plurality of unit delays 51 which are shift registers, first multipliers 52, a second multiplier 54, and an adder 53. With regard to the operation of each of these elements, the unit delays 51 are connected in series and operate to output delay signals; the first multipliers 52 multiply predetermined gain values ($k_1$, $k_2$, ... $k_F$) to each of the delay signals output from the unit delays 51; the adder 53 obtains a sum of the output of the first multipliers 52 and outputs the same; and the second multiplier 54 multiplies the output of the adder 53 to an inverse of the sum of all the gain values, thereby obtaining the filtered, smooth speed profile Vb". Here, "F" denotes a size of an acceleration interval of the servo motor 40.

If a transfer function of a digital filter is f(nT) and a filter input signal is V(nT), a filter output w(nT) is indicated by a convolution of the filter input signal V(nT) and the transfer function f(nT) as shown in Equation 1 below.

Equation 1

$$w(nT) = \sum_{i=0}^{\infty} v(nT - iT) * f(iT)$$

where T is a sampling cycle, and n=(0, 1, 2 ...).

Accordingly, if a speed profile Va(nT) is input to the low pass filter 50, a speed profile Vb(nT) output by the low pass filter 50 is as shown in Equation 2 below.

Equation 2

$$V_b(nT) = \frac{\sum_{i=1}^{F} k_i * V_a(nT - iT)}{S_k}, \quad S_k = \sum_{i=1}^{F} k_1$$

With the actual use of the low pass filter 50 as shown FIG. 8, since the sum of all the gain values ($S_k$) is established as an initial value, no real impact is given to the calculation speed of the filter.

The change in the acceleration of the servo motor 40 is determined by the gain value $k_i$ of Equation 2. For simplicity, if the gain value $k_i$ is expressed as a continuous function k(t) related to time t, and k(t) has a primary function relation with regard to time as shown in Equation 3 below, the low pass filter 50 outputs the filtered speed profile Vb" as shown in FIG. 6 when the speed profile Va as shown in FIG. 3 is input therein.

Equation 3

$$k(t) = \begin{cases} \frac{2a}{F}t & 0 < tPREC\frac{F}{2}, \\ \frac{2a}{F}(F - t) & \frac{F}{2} < tPRECF. \end{cases}$$

where a is a random number $\geq 0$. The relation of Equation 3 is illustrated in the graph of FIG. 9a. Because the low pass filter 50 is digital, this gain value k(t) is actually obtained by sampling at a sampling cycle T for a period from 0 to F. The acceleration and deceleration sections of the filtered speed profile Vb' of FIG. 6 are curved.

Further, if the filtered speed profile Vb' is differentiated, the acceleration profile A' and the jerk profile J' of FIG. 6 is obtained. That is, the jerk profile J' obtained using the two linear filters of the conventional interpolator can be obtained using the single low pass filter 50 of the present invention.

On the other hand, if the gain value k(t) has a secondary function related to time of Equation 4 below, the low pass filter 50 outputs a speed profile Vb" as shown in FIG. 10 when the speed profile Va of FIG. 3 is input therein.

Equation 4

$$k(t) = -at(t-F), \quad 0 < t < F$$

where a is a random number $\geq 0$. The relation of Equation 4 is illustrated in the graph of FIG. 9b. If the speed profile Vb" of FIG. 10 is differentiated, a speed profile A" and a jerk profile J" as shown in FIG. 10 are obtained. As shown in the drawing, the jerk profile J" of FIG. 10 is significantly smoother than that shown in FIG. 6, indicating that the servo motor 40 is able to operate smoothly. Because the jerk profile becomes smooth in direct relation to increases in an order number of the gain values, damage to the robot body caused by jerk movements is reduced.

A path planning method for robots according to a preferred embodiment of the present invention will be described hereinafter.

First, the initial speed profile Va is calculated after input of the predetermined target position. Next, path interpolation of the initial speed profile Va is performed to obtain the smooth, filtered speed profile Vb", after which acceleration of the servo motor 40 is controlled using the filtered speed profile Vb". Here, the path interpolation is realized using the single low pass filter 50.

With regard to filtering using the low pass filter 50, after receiving input of the initial speed profile Va, a plurality of delay signals having sequential delay values are output by the unit delays 51. The first multipliers 52 then multiply predetermined gain values to each of the delay signals output from the unit delays 51, after which the resulting values are output by the first multipliers 52. The adder 53 subsequently obtains a sum of the values output by the first multipliers 52 and outputs the same. As a final step, the second multiplier 54 multiplies the output of the adder 53 (the sum of the values output by the first multipliers 52) to an inverse of the sum of all the gain values.

In the above, by adjusting the gain values of the low pass filter 50, the rate of change of acceleration of the servo motor 40 can be controlled. If the gain values are expressed as consecutive functions related to time, smoothness in the operation of the servo motor 40 increases in relation to an increase in the order of the functions. That is, when the speed profile Va input to the low pass filter 50 is 0, the jerk profile J" becomes a 0 order in the case where the gain value is a first order function with relation to time, while the jerk profile J" becomes a first order in the case where the gain value is a secondary order function with relation to time.

Using the path planning apparatus and method for robots of the present invention, smoothness can be obtained by increasing the order of the jerk profile, thereby reducing damage given to the robot body and improving overall control. Further, with the use of the single low pass filter, the amount of time required for the filtering calculation is reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A path planning apparatus comprising:
    a planner which receives target positioning information, performs calculations using this information to obtain an initial speed profile, then outputs the initial speed profile;
    an interpolator which receives the initial speed profile from the planner, performs a predetermined operation on the same to obtain a filtered speed profile that is smoother than the initial speed profile, and outputs the filtered speed profile;
    a servo controller which receives output of the interpolator and outputs acceleration and deceleration control signals according to the output of the low pass filter;
    a servo motor which is controlled by the signals received from the servo controller
    a plurality of unit delays connected in series and operating to output delay signals;
    a plurality of first multipliers for multiplying predetermined gain values to each of the delay signals output from the unit delays, said predetermined gain values being functions of time;
    an adder for obtaining a sum of the output of the first multipliers and outputting the same; and
    a second multiplier which multiplies the output of the adder to an inverse of the sum of all the gain values to obtain the filtered speed profile.

2. The apparatus of claim 1 wherein the unit delays are shift registers.

3. The apparatus of claim 1 wherein the gain values are a first order function related to time.

4. The apparatus of claim 3 wherein the first order function is expressed by the following equation:

$$k(t) = \begin{cases} \dfrac{2a}{F}t & 0 < tPREC\dfrac{F}{2}, \\ \dfrac{2a}{F}(F-t) & \dfrac{F}{2} < tPRECF. \end{cases}$$

where t is time, k(t) are the gain values, F is a size of an acceleration interval of the servo motor, and a is a random number >0.

5. The apparatus of claim 1 wherein the gain values are a second order function related to time.

6. The apparatus of claim 5 wherein the second order function is expressed by the following equation:

$$k(t) = -at(t-F), \ 0 < t < F$$

where t is time, k(t) are the gain values, F is a size of an acceleration interval of the servo motor, and a is a random number >0.

7. A path planning method for robots comprising the steps of:
 calculating an initial speed profile calculated after receiving input of signals corresponding to a predetermined target position;
 obtaining a filtered speed profile by interpolating the initial speed profile using a single low pass filter;
 outputting a plurality of delay signals having sequential delay values by successively delaying the input signals;
 multiplying predetermined gain values to each of the delay signals and outputting the resulting values;
 obtaining a sum of the values resulting from multiplying the gain values to the delay signals, and outputting a resulting sum value; and
 multiplying the sum value to an inverse of a sum of all the gain values.

8. The method of claim 7 wherein calculation of the sum of all the gain values and establishment of the same as an initial value is performed before operation of the low pass filter.

9. The method of claim 7 wherein the gain values are adjusted to control acceleration and deceleration of the servo motor.

10. The apparatus of claim 7 wherein the gain values are a first order function related to time.

11. The apparatus of claim 10 wherein the first order function is expressed by the following equation:

$$k(t) = \begin{cases} \dfrac{2a}{F}t & 0 < tPREC\dfrac{F}{2}, \\ \dfrac{2a}{F}(F-t) & \dfrac{F}{2} < tPRECF. \end{cases}$$

where t is time, k(t) are the gain values, F is a size of an acceleration interval of the servo motor, and a is a random number >0.

12. The apparatus of claim 7 wherein the gain values are a second order function related to time.

13. The apparatus of claim 12 wherein the second order function is expressed by the following equation:

$$k(t) = -at(t-F), \ 0 < t < F$$

where t is time, k(t) are the gain values, F is a size of an acceleration interval of the servo motor, and a is a random number $\geq 0$.

* * * * *